(12) United States Patent
Kote et al.

(10) Patent No.: US 10,672,004 B2
(45) Date of Patent: *Jun. 2, 2020

(54) MANAGING FRAUDULENT SIGN-UPS AT PAYMENT SYSTEMS

(71) Applicant: PAYPAL, INC., San Jose, CA (US)

(72) Inventors: Yashovardhana Samethanahalli Kote, Fremont, CA (US); Srivathsan Narasimhan, Saratoga, CA (US)

(73) Assignee: PayPal, Inc., San Jose, CA (US)

( * ) Notice: Subject to any disclaimer, the term of this patent is extended or adjusted under 35 U.S.C. 154(b) by 192 days.

This patent is subject to a terminal disclaimer.

(21) Appl. No.: 15/278,602

(22) Filed: Sep. 28, 2016

(65) Prior Publication Data
US 2018/0089682 A1 Mar. 29, 2018

(51) Int. Cl.
*G06Q 20/40* (2012.01)
*H04L 29/06* (2006.01)

(52) U.S. Cl.
CPC ..... *G06Q 20/4016* (2013.01); *G06Q 20/4014* (2013.01); *H04L 63/102* (2013.01); *H04L 2463/102* (2013.01)

(58) Field of Classification Search
CPC .................. G06Q 20/4016; G06Q 20/4014
See application file for complete search history.

(56) References Cited

U.S. PATENT DOCUMENTS

| | | | | |
|---|---|---|---|---|
| 8,489,067 B2* | 7/2013 | Rackley, III | ......... | G06Q 20/102 455/406 |
| 2006/0271457 A1* | 11/2006 | Romain | ................. | G06Q 20/04 705/35 |
| 2012/0078735 A1* | 3/2012 | Bauer | .................... | G06O 20/20 705/16 |
| 2013/0091052 A1* | 4/2013 | Kaperdal | ............ | G06Q 20/227 705/39 |

(Continued)

FOREIGN PATENT DOCUMENTS

RU 2419872 C2 * 5/2011 ........... G06Q 20/327

OTHER PUBLICATIONS

George Popescu, "How People Commit Fraud in Unsecured Personal Lending," <https://lending-times.com/2016/07/12 (Year: 2016).*

(Continued)

*Primary Examiner* — Alexander G Kalinowski
*Assistant Examiner* — William B. Bunker
(74) *Attorney, Agent, or Firm* — Haynes and Boone LLP (57) ABSTRACT

A method for detecting fraudulent sign-ups at a payment system is discussed. The method includes receiving a suspect sign-up request for creating a new user account at the payment system. The method includes providing access to a new duplicate user account responsive to receiving the suspect sign-up request, the new duplicate user account imitating the new user account. The method includes initiating a fraud determination of whether the suspect sign-up request is fraudulent. The method includes receiving a request from the user device, the request for adding a new (Continued)

financial account to the new user account. The method includes providing an indication of an addition of the new financial account to the new user account. The method also includes delaying the addition of the new financial account to the new user account until receiving results of the fraud determination.

20 Claims, 7 Drawing Sheets

(56) References Cited

U.S. PATENT DOCUMENTS

| | | | | |
|---|---|---|---|---|
| 2013/0263226 | A1* | 10/2013 | Sudia | H04L 63/1466 |
| | | | | 726/4 |
| 2014/0096226 | A1* | 4/2014 | Barkan | G06F 21/57 |
| | | | | 726/11 |
| 2014/0258126 | A1* | 9/2014 | Johns | G06Q 20/108 |
| | | | | 705/44 |
| 2015/0310201 | A1* | 10/2015 | Sugiyama | H04W 12/12 |
| | | | | 726/7 |
| 2016/0005029 | A1* | 1/2016 | Ivey | G09C 1/00 |
| | | | | 705/44 |
| 2018/0176250 | A1* | 6/2018 | Zhong | H04L 63/08 |
| 2018/0218370 | A1* | 8/2018 | Denton | G06Q 20/34 |
| 2019/0043026 | A1* | 2/2019 | Solis | G06Q 30/06 |

OTHER PUBLICATIONS

Dave Riju, "Don't get cheated by online fraudsters: Here's how to protect yourself," https://economictime.indiatimes.com/wealth/plan (Year: 2016).*

* cited by examiner

MANAGING FRAUDULENT SIGN-UPS AT PAYMENT SYSTEMS

BACKGROUND

Embodiments of the inventive subject matter generally relate to the field of communication systems and, more particularly, to managing fraudulent logins and/or sign-ups that can be communicated, via communication systems, to a payment system.

A payment system is a platform that facilitates management and transfer of funds between payment accounts. Each payment account can be associated with a separate user. Each payment account can have a balance of funds. A user can sign-up for the payment system in order to create a new payment account. Once the user signs-up for the new payment account, the user can associate multiple financial accounts with that payment account. The user can also login to the payment account to access his or her financial accounts, manage the payment account, and other functionality. The user can then transfer funds between the multiple financial accounts and/or the payment account.

However, as with some online platforms, there are risks associated with fraudulent access to the payment system. For example, there can be fraudulent sign-ups for new payment accounts at the payment system. There can also be fraudulent logins to existing payment accounts. The payment system may not be able to properly process fraudulent sign-ups and logins, and thus leave the door open for additional fraudulent attacks.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although some examples refer to online marketplaces, other types of shopping and service providers are contemplated.

Payment systems facilitate management and transfer of funds between payment accounts, where each payment account can be associated with a different user. Each payment account at the payment system can have a balance of funds. A user can sign-up for the payment system to create a new payment account. Once the sign-up is successful, the user can then add (e.g. associate) new financial accounts to that payment account. The user can also withdraw (e.g., disassociate) an existing financial account from the user's payment account. A financial account can be an account at a bank, at a credit card company, or at another financial institution. The payment account can have a separate fund balance from each of the associated financial institutions. The user can transfer funds between the multiple financial accounts and/or the payment account. The transfer of funds can include the user sending funds from the user's payment account to another payment account, or receiving funds at the user's payment account from the another payment account. The user can also login to the payment account to access his or her financial accounts, manage the payment account, and other functionality. However, there are risks associated with fraudulent sign-ups for new payment accounts and/or with fraudulent logins to existing payment accounts at the payment system.

The following discussion is directed to detecting fraudulent sign-ups and fraudulent logins at payment systems. The payment system can determine that a received sign-up request or login request is suspect if that request has a certain chance of being fraudulent. The payment system can also randomly select a sign-up request or login request from received requests to check its fraud detection algorithms. In some embodiments, when the payment system receives a suspect login from a user, the payment system can provide access to a duplicate payment account to the user. Any subsequent transaction requests from the user can then be added to a queue while the payment system determines whether the suspect login is fraudulent. Similarly, when the payment system receives a suspect sign-up from a user, the payment system can provide access to a new duplicate payment account to the user. Any subsequent transaction requests from the user can then be added to a queue while the payment system determines whether the suspect sign-up is fraudulent. In both cases, if the payment system determines that the login or sign-up is not fraudulent, the payment system can then perform the requested transactions in the queue. The following description and associated Figures illustrate various embodiments directed to the ideas discussed above.

Figure 1:
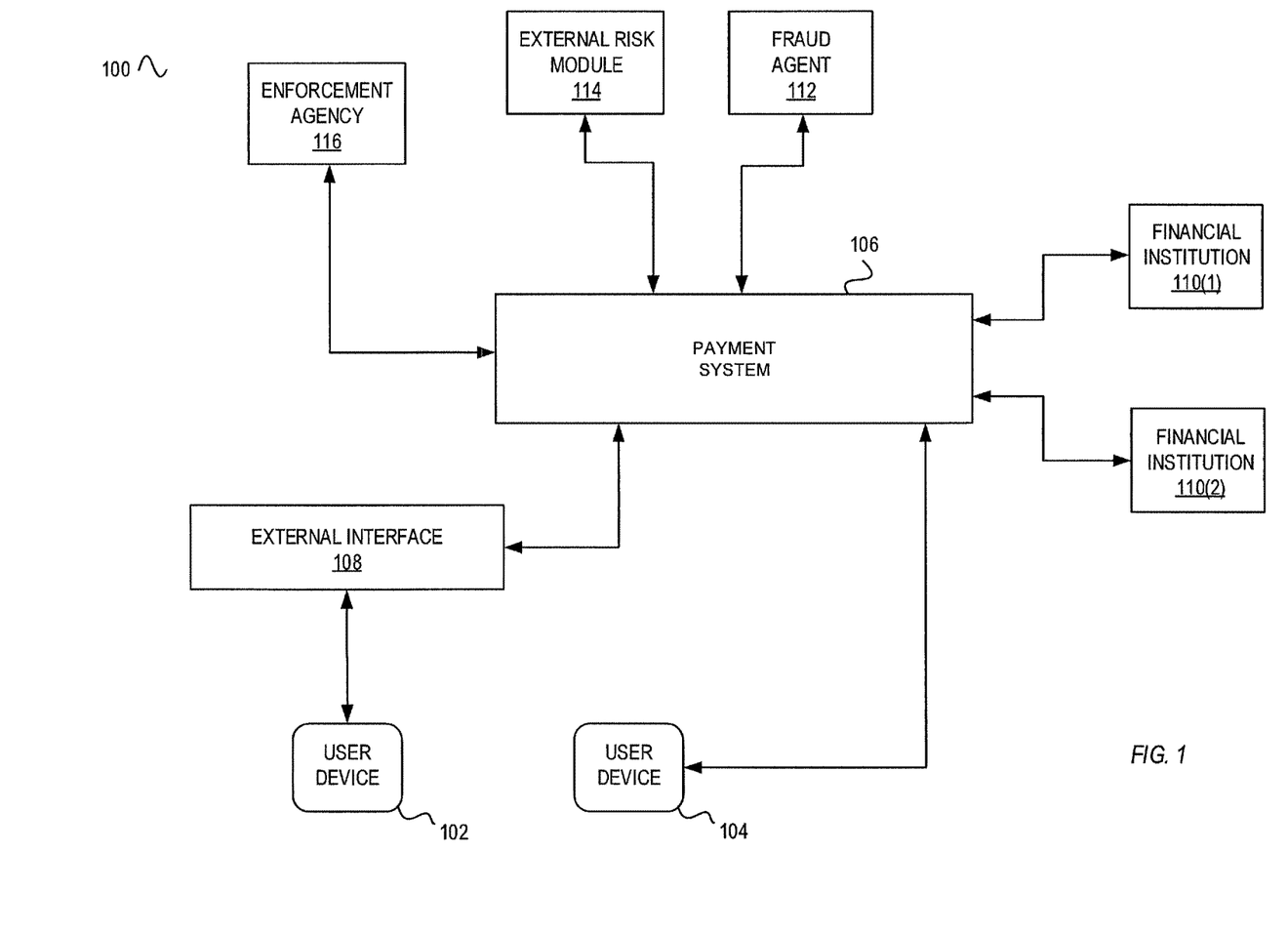
FIG. 1 is a system diagram illustrating embodiments of a communication system showing a payment system.

FIG. 1 is a system diagram illustrating embodiments of a communication system showing a payment system. In an overview of the system diagram 100, a user device 102 and/or a user device 104 can attempt to access payment accounts at a payment system 106. A user can sign-up, via the user device 102 or the user device 104, for the payment system 106 to create a new payment account. The user can also login, via the user device 102 or the user device 104, to the payment account to manage his or her payment account, as well as to transfer funds to/from associated financial accounts at financial institutions 110(1) and 110(2). The user device 102 can access the payment system 106 via an external interface 108. The external interface can be provided via an online marketplace, an online merchant, an offline retail merchant at a Point-of-Sale, an unmanned vending machine/kiosk, or another indirect method of accessing the payment system 106.

Financial institutions 110(1) and 110(2) (collectively referred to as financial institutions 110) can provide financial services to users. Financial institutions 110 can be implemented as banks, credit unions, other deposit-taking institutions that accept and manage deposits and make loans, and other financial service providers. In some embodiments, the financial institutions 110 can include credit card networks, e.g., for funding transfer of money between users. In some embodiments, the financial institutions 110 may include a provider of purchasing power that is associated with a loyalty program. In one embodiment, the payment system 106 can access funds associated with a buyer's payment account by accessing the buyer's financial institution 110(1), and transfer these funds to a seller's payment account by accessing the seller's financial institution 110(2).

In some embodiments, the payment system 106 can access a fraud agent 112 and/or an external risk module 114 to determine whether the suspect login or the suspect sign-up is fraudulent. While the payment system 106 determines whether a suspect login or a suspect sign-up is fraudulent, the payment system can also indicate to the user device 104 (i.e., the initiator of the suspect login or the suspect sign-up), that the suspect login or the suspect sign-up was successfully performed. While the payment system 106 determines whether the suspect login or the suspect sign-up is fraudulent, the payment system 106 can also delay any subsequent transaction requests received from the user device 104. While the payment system 106 determines whether the suspect login or the suspect sign-up is fraudulent, the payment system 106 can also indicate, to the user device 104, that the delayed requested transactions were successfully initiated or even successfully performed. The payment system 106 can delay the requested transactions by quarantining them until the suspect login request is found not to be fraudulent. If the suspect login or the suspect sign-up request is found to be fraudulent, the payment system 106 can communicate with an enforcement agency 116, such as a governmental regulatory agency, to report the fraudulent request.

In some embodiments, the payment system 106 can receive a suspect login request from the user device 102 or the user device 104 for logging into an existing user account at the payment system 106. In response to receiving the suspect login request, the payment system 106 can provide access to a duplicate user account. The duplicate user account can be a copy of a portion of the existing user account. The duplicate user account can provide, to the user device 102 or 104, restricted or no access to the payment system 106. The payment system 106 can initiate a fraud determination of whether the suspect login request is fraudulent. The payment system 106 can receive a subsequent request for transferring a first amount of funds from the existing user account to another account. The payment system 106 can delay processing both the login request and the subsequent request, while providing indications to the user device 102 or 104 that both requests are being performed. The payment system 106 can delay a transfer of the first amount of funds to the other account, and delay access for the user device 102 or 104 to the existing user account, until receiving results of the fraud determination indicating that the suspect login request is not fraudulent. The delay may allow the payment system 106 to wait for the fraud determination to be performed, which may include complex computation, external queries, and/or large number of database lookup (which may also build confidence associated with the results of the fraud determination.

In some embodiments, the payment system 106 can receive a suspect sign-up request from the user device 102 or the user device 104 for creating a new user account at the payment system 106. In response to receiving the suspect sign-up request, the payment system 106 can provide access to a new duplicate user account, where the duplicate user account is a new user account that can have restricted access to the payment system 106. The payment system 106 can initiate a fraud determination to determine whether the suspect sign-up request is fraudulent. The payment system 106 can receive a subsequent request from the user device 102 or 104 for adding a new financial account to the new user account. The payment system can also receive subsequent requests for other transactions, such as adding a new address for the user, changing a password associated with the payment account, modifying other contact information of the user, among others. The payment system 106 can delay processing both the sign-up request and the subsequent request, while providing indications to the user device 102 or 104 that both requests are being performed. The payment system 106 can delay creation of the new user account, and delay addition of a new financial account to the new user account, until receiving results of the fraud determination indicating that the suspect sign-up request is not fraudulent.

Figure 2:
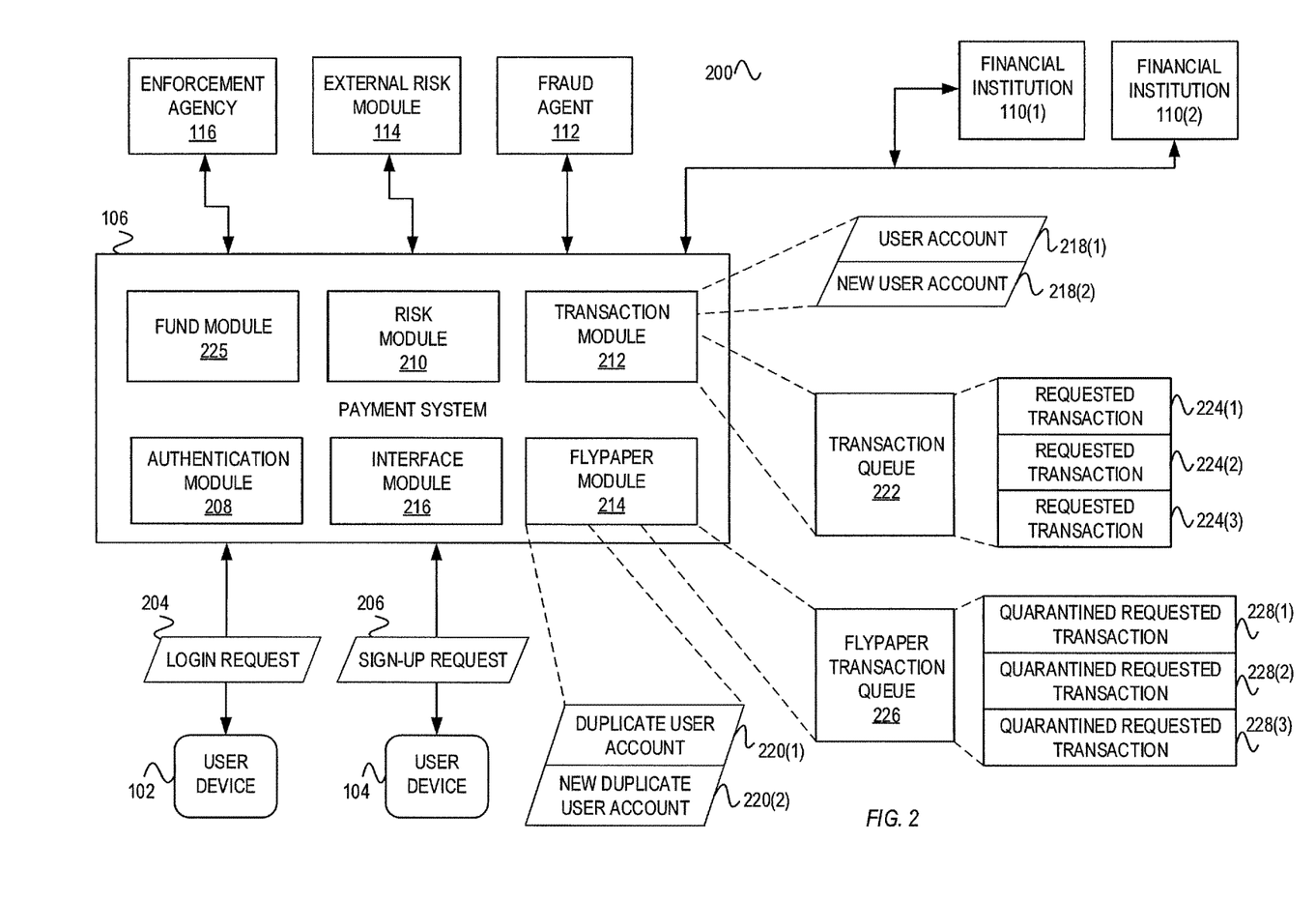
FIG. 2 is a system diagram illustrating embodiments of a payment system that uses a flypaper module to manage fraudulent logins and sign-ups.

FIG. 2 is a system diagram illustrating embodiments of a payment system that uses a flypaper module to manage fraudulent logins and sign-ups. The payment system 106 shown in FIG. 2 includes an authentication module 208, a risk module 210, a transaction module 212, a flypaper module 214, an interface module 216, and a fund module 225. The payment system 106 can receive an initial request, i.e., a login request 204 from the user device 102 or a sign-up request 206 from the user device 104. The authentication module 208 can determine whether the initial request is suspect, such as by determining whether a probability that the initial request is fraudulent is higher than a certain threshold. In some embodiments, the risk module 210 can perform an initial determination of whether the initial request is fraudulent, suspect, or good (i.e., neither fraudulent nor suspect). If the initial request is not suspect (i.e., the request is good), the authentication module 208 can communicate with the transaction module 212 to process the login request 204 or the sign-up request 206.

Login Requests

For logins, if the login request 204 is not suspect (i.e., the request is good), the payment system 106 can process the login request 204 to allow the user device 102 access to the user account 218(1). The transaction module 212 can receive and process requested transactions, from the user device 102, for the user account 218(1). The transaction module 212 can access the user account 218(1) indicated by the login request 204. The transaction module 212 can communicate with the interface module 216 to provide a user interface to the user device 102 that allows the user device to access the user account 218(1). Example of the user account 218(1) is discussed below with reference to FIG. 3. The requested transactions 224(1)-224(3) can be for adding financial accounts to the user account 218(1). The received requested transactions can be for transferring funds between financial accounts associated with the user account 218(1), or for providing payments for certain services or goods. The transaction module 212 can add the requested transactions 224(1)-224(3) to the transaction queue 222 for processing. The transaction module 212 can then process the requested transactions 224(1)-224(3) and transfer funds, or disburse funds, such as using the fund module 225.

If the login request 204 is suspect, the authentication module 208 can communicate the suspect login request 204 to the risk module 210, the external risk module 114, and/or the fraud agent 112 to perform fraud determination. The authentication module 208 can also communicate the login request 204 to the flypaper module 214 for processing. When the flypaper module 214 processes the login request 204, it is referred to as the suspect login request. The flypaper module 214 can then generate and access a duplicate user account 220(1) that can be a copy of the user account 218(1). The flypaper module 214 can communicate with the interface module 216 to provide a duplicate user interface (not shown in FIG. 2) to the user device 102 that allows the user device 102 to access the duplicate user account 220(1).

The duplicate user interface allows the user device 102 to access the duplicate user account 220(1). The duplicate user interface provides the duplicate user account 220(1) to the user device 102 to imitate access to the user account 218(1), e.g., by providing an appearance of the user account 218(1). The duplicate user interface does not show any discrepancy or otherwise indicate a lack of functionality, or indicate that fraud determination is being performed on the suspect login request 204. The duplicate user interface can provide to the user device 102 access to various data and information that appears (e.g., to a user of the user device 102) to be that of the actual user account 218(1). In some embodiments, during determination by the flypaper module 214 of whether a certain login request is fraudulent, any subsequent login requests to the user account 218(1) can be provided access (i.e., to the initiator of the subsequent login request) to the duplicate user account 220(1).

The flypaper module 214 can receive requested transactions for the user account 218(1) and add them as quarantined requested transactions 228(1)-228(3) to the flypaper transaction queue 226. In the flypaper transaction queue 226, the quarantined requested transactions 228(1)-228(3) are delayed and are not processed. However, the flypaper module 214 can indicate, via the interface module 216, to the user device 102 that the quarantined requested transactions have either been successfully performed or successfully initiated. The duplicate user interface can provide the user device 102 access to the quarantined requested transactions 228(1)-228(3).

Upon receiving results of the fraud determination, the authentication module 208 can communicate with the flypaper module 214 to indicate whether the suspect login request 204 is fraudulent. If the suspect login request 204 is found to be fraudulent, the flypaper module 214 can initiate fraud preventative actions. The fraud preventative actions can also include the flypaper module 214 communicating with the risk module 210, the external risk module 114, and/or the fraud agent 112 to report the fraudulent login request 204, and to possibly add more data on fraudulent users for subsequent fraud determination. The fraud preventative actions can also include the flypaper module 214 communicating with the enforcement agency 116, such as a governmental regulatory agency, to report the fraudulent login request 204.

If the suspect login request 204 is found not to be fraudulent, the payment system 106 can process the suspect login request 204 to allow the user device 102 access to the user account 218(1). The flypaper module 214 can communicate with the transaction module 212 indicating that the suspect login 204 is not fraudulent. In some embodiments, upon determination that the suspect login request 204 is not fraudulent, the transaction module 212 can simply transfer the quarantined requested transaction 228(1) (associated with the suspect login request 204) from the flypaper transaction queue 226 to the transaction queue 222. In some embodiments, the transaction module 212 can add a requested transaction 224(1) (to be associated with the login request 204) to the transaction queue 222, where the requested transaction 224(1) corresponds to the quarantined requested transaction 228(1). The transaction module 212 can then communicate with the fund module 225 to process the requested transaction 224(1), such as to transfer funds.

Sign-Up Requests

For sign-ups, if the sign-up request 206 is not suspect (i.e., the request is good), the payment system 106 can process the suspect sign-up request 206 to create a new user account 218(2) for the user of the user device 104. Once the new user account 218(2) is created, the payment system 106 can, similarly to that described above with reference to processing of the login request 204, receive and process requested transactions from the user device 104 for the user account 218(1). The transaction module 212 can also communicate with the interface module 216 to provide a user interface to the user device 104 that allows the user device to access the user account 218(1).

Similarly as described above with reference to logins, if the sign-up request 206 is suspect, the authentication module 208 can communicate with the flypaper module 214 to process the suspect sign-up request 206. The flypaper module 214 can then create a new duplicate user account 220(2) that is associated with the suspect sign-up request 206. The flypaper module 214 can also communicate with the interface module 216 to provide a duplicate user interface to the user device 104 that allows the user device to access the new duplicate user account 220(2). The duplicate user interface can provide to the user device 104 access to various data and information that appears (e.g., to a user of the user device 104) to be that of the actual user account 218(2). In some embodiments, during determination by the flypaper module 214 of whether a certain signup request is fraudulent, any login requests to this new user account can be provided access (i.e., to the initiator of the login request) to the duplicate new user account 220(2).

The flypaper module 214 can communicate with the interface module 216 to prompt additional questions to the user device 104. For example, the interface module 216 can send communication to the user device 104 to display prompts on a user interface of the user device 104 regarding additional information on the user. This additional information can be used by the payment system 106 to more accurately determine whether the suspect start-up request is fraudulent. The interface module 216 can also indicate delays (which can be artificially created) in processing of the sign-up request 206. Similarly, the duplicate user interface can allow the user device 104 to access the quarantined requested transactions 228(1)-228(3), e.g., to appear as requested transactions that are being processed.

If the suspect sign-up request 206 is found not to be fraudulent, the payment system 106 can process the suspect sign-up request 206 to create the new user account 218(2). The flypaper module 214 can communicate with the transaction module 212 indicating that the suspect sign-up request 206 is not fraudulent. Similarly as described above with reference to logins, the flypaper module 214 can also process any of the quarantined requested transactions 228(1)-228(3) in the flypaper transaction queue 226 that are associated with the sign-up request 206.

Figure 3:
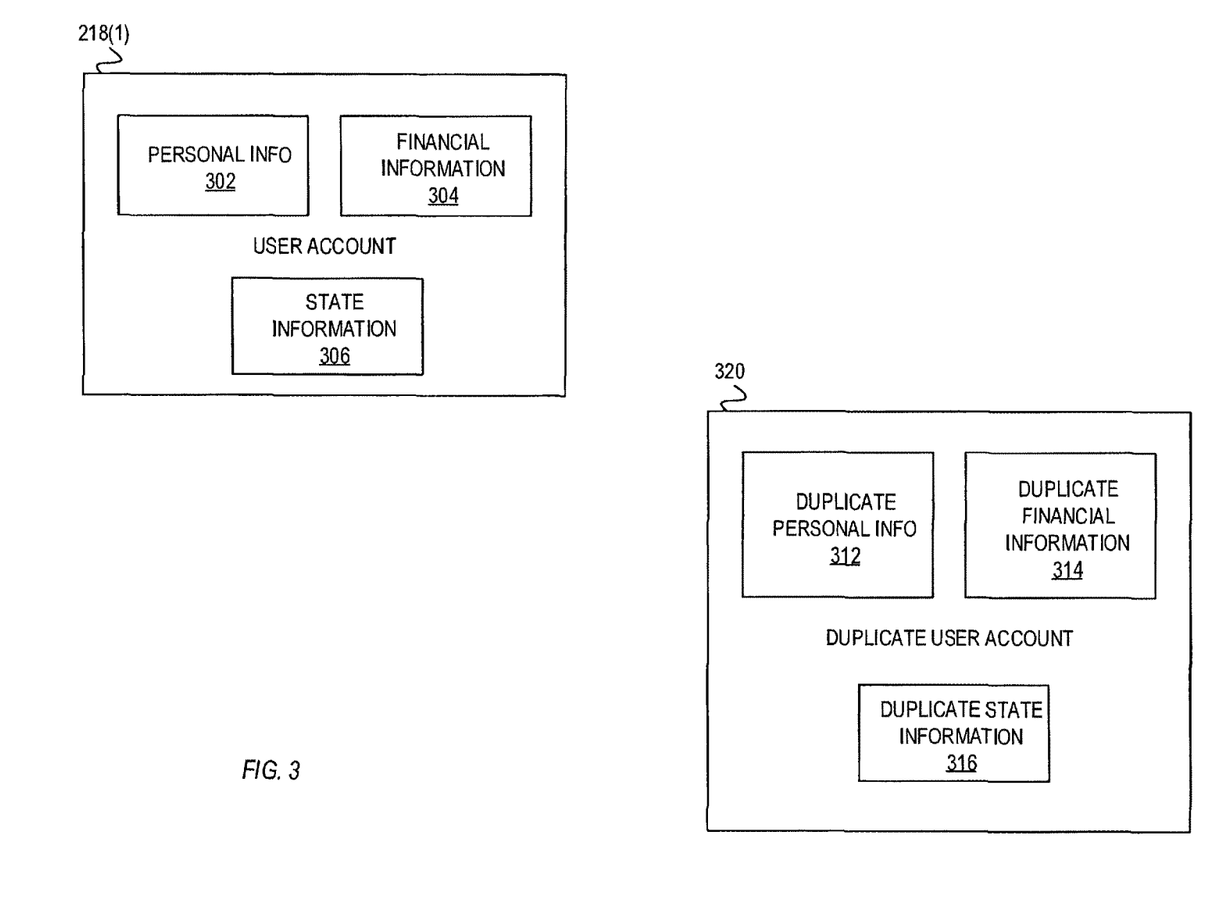
FIG. 3 is a diagram illustrating embodiments of a user account and a duplicate user account.

FIG. 3 is a diagram illustrating embodiments of a user account and a duplicate user account. The user account 218(1) includes personal information 302, financial information 304, and state information 306. The personal information 302 can include name, address, date of birth, and other personal data of the user of the user account 218(1). The financial information 304 can indicate which financial institution (e.g., the financial institution 110(1) or the financial institution 110(2)) is associated with the user account 218(1). The state information 306 can include logical states of the user account 218(1), such as a status of any requested transactions and/or status of risk analysis, among others, and/or whether the user account 218(1) is active, disabled, or locked.

A duplicate user account 320 imitates either an existing user account (e.g., the user account 218(1)) or a new user account. The duplicate user account 320 includes duplicate personal information 312, duplicate financial information 314, and duplicate state information 316. When the user device 102 or 104 accesses the duplicate user account 320 (e.g., via the duplicate user interface), the duplicate user account 320 appears to the user device 102 or 104 as a regular user account, and imitates regular functionality of a regular user account (e.g., including indicating an imitated state of the duplicate user account 320).

When processing a suspect login request for logging into the user account 218(1), the flypaper module can generate the duplicate user account 320 based on the corresponding user account 218(1). Thus, the duplicate personal information 312 can be based on the personal information 302. The duplicate financial information 314 can be based on the financial information 304. The duplicate state information 316 can be based on the state information 306. While the associated suspect login request is being processed, any changes of the subsequent requests (i.e., as indicated by the quarantined requested transactions) can be applied by the flypaper module 214 to the duplicate user account 320, instead of the user account 218(1) to which they are directed.

When processing a suspect sign-up request, the flypaper module 214 can create a new duplicate user account 320 based on information in the suspect sign-up request, to imitate a new user account. Thus, the duplicate personal information 312 (also referred to as imitation personal information) can be based on personal information indicated by the suspect sign-up request. The duplicate financial information 314 (also referred to as imitation financial information) can be based on financial information indicated by the suspect sign-up request. The duplicate state information 316 (also referred to as imitation state information) can indicate an initial state of the new duplicate user account 320. While the associated suspect sign-up request is being processed, any changes of the subsequent requests (i.e., as indicated by the quarantined requested transactions) can be applied by the flypaper module to the new duplicate user account 320, as there may not be a corresponding user account.

If the suspect login request is found not to be fraudulent, the flypaper module can apply at least some changes made to the duplicate user account 320 to the corresponding user account 218(1). If the suspect sign-up request is found not to be fraudulent, the flypaper module can apply at least some elements of the duplicate user account 320 to a new user account. If the suspect login request or the suspect sign-up request is found to be fraudulent, the flypaper module can use the duplicate user account 320 to aid with the fraud determination.

Figure 4:
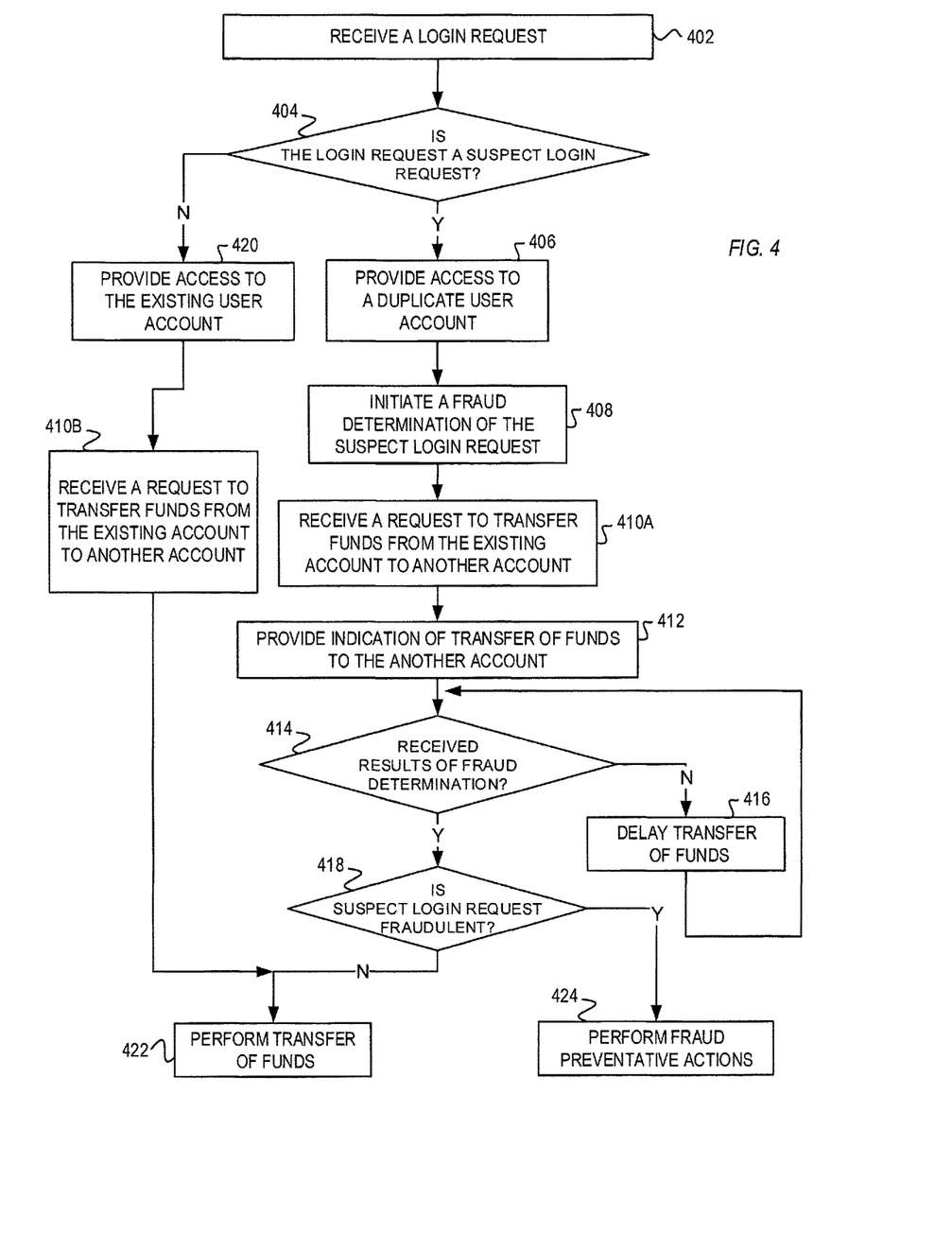
FIG. 4 is a flow diagram illustrating embodiments of operations for processing of fraudulent login requests.

FIG. 4 is a flow diagram illustrating embodiments of operations for processing of fraudulent login requests. The method of FIG. 4 is described with reference to the systems and components described in FIGS. 1-3 (for illustration purposes and not as a limitation). The example operations can be carried out by various modules of the payment system 106.

Beginning with 402, a payment system receives a login request for logging into an existing user account at the payment system 106. For example, the authentication module 208 can receive the login request 204 from the user device 102.

At 404, the payment system determines whether the login request is a suspect login request. In some embodiments, an authentication module of the payment system can determine an authentication risk level of the login request, such as by communicating with a risk module. The risk module (e.g., the risk module 210 or the external risk module 114) can indicate an authentication risk level of the login request. The authentication module can determine if the authentication risk level is higher than a risk threshold. If the authentication risk level is higher than a risk threshold, the authentication module can indicate that the login request is a suspect login request. In another embodiment, the authentication module can randomly select the login request as the suspect login request. By randomly selecting the suspect login request, the payment system can perform quality control on risk analysis and fraud determination algorithms, without being biased by these algorithms that select suspect login or sign-up requests. If the payment system determines that the login request is a suspect login request, the payment system performs element 406 next. Otherwise, the payment system performs 420 next.

At 406, the payment system provides access to a duplicate user account. The flypaper module can provide access to the duplicate user account responsive to receiving the suspect login request. As discussed above with reference to FIG. 3, the duplicate user account 220(1) can be based on the suspect login request, and can include a copy of state information of the existing user account 218(1) and a copy of financial information of the existing user account 218(1). The payment system can provide access to the copy of the financial information without modifying the financial information of the existing user account.

Furthermore, in response to receiving the suspect login request, the payment system can generate a duplicate user interface to be provided to an initiator of the suspect login request. With reference to FIG. 2, the interface module 216 can provide the duplicate user interface to the user device 102 that initiated the suspect login request 204. The duplicate user interface can be based on the duplicate user account, and can provide imitation controls for imitating access to the financial information of the existing user account. For example, the user device 102 can receive communication from the interface module 216 for displaying the duplicate user interface with imitation controls. The interface module 216 can receive communication from the user device 102, via the duplicate user interface, that modify the contents of the duplicate user account (e.g., the user account 220(1)), without affecting the existing user account (e.g., the user account 218(1)).

At 408, the payment system initiates fraud determination of the suspect login request. For example, the authentication module 208 can communicate with the risk module 210, the fraud agent 112, and/or the external risk module 114 to initiate the fraud determination. The payment system can also add the suspect login request into the flypaper transaction queue, such as to asynchronously perform fraud determination.

At 410A, the payment system receives a request to transfer funds from the existing account to another account.

The payment system can also receive a request to add another account, which can be a bank account. The payment system can add both subsequent requests (i.e., the request to add another account and the request to transfer of funds to that account) to the flypaper transaction queue.

It is noted that 410B is similar to 410A, as the payment system also receives a subsequent request to transfer funds from the existing account to another account at 410B. However, the flow to 410B is from element 420 where the login request is not suspect (i.e., the request is good), whereas the flow to 410A is from element 408 where the suspect login is received. Furthermore, the requested transaction of 410B can be added to the transaction queue 222, and not to the flypaper transaction queue 226.

At 412, the payment system provides an indication of a transfer of funds to another account. The indication can indicate origin at the existing user account, however, the indication can be transmitted from the duplicate user account. For example, the flypaper module 214 can transmit the indication to the user device 102. The indication can indicate that the funds are transferred from the user account 218(1) to another account (i.e., as requested at 410A). The indication can indicate its origin at the user account 218(1). The indication can also indicate that the login request (of element 402) is successful. However, the indication is instead directed to imitated operations on the duplicate user account 220(1), as no fund transfers or other operations of the requested transactions are performed.

At 414, the payment system determines whether results of the fraud determination have been received. For example, the flypaper module 214 can determine whether it has received results of the fraud determination from the risk module 210, the external risk module 114, and/or the fraud agent 112. If the results of the fraud determination have been received, flow continues to 418. Otherwise, flow continues to 416 where the payment system delays the transfer of funds. With reference to the above examples, the payment system 106 may not process the quarantined requested transaction 228(1) that was requested at 410A.

At 418, the payment system determines if the suspect login request is fraudulent. With relation to the above examples, the flypaper module 214 can determine if the results of the fraud determination (e.g., from the risk module 210, the external risk module 114, and/or the fraud agent 112) indicate that the suspect login request 204 is fraudulent. If the results of the fraud determination indicate that the suspect login request is fraudulent, flow continues to 424 where fraud preventative actions are taken. Otherwise, flow continues to 422 and performs the transfer of funds.

At 420, the payment system provides access to the existing user account. With relation to FIG. 2, the transaction module 212 can provide access to the user account 218(1) in response to the login request 204.

At 422, the payment system performs the transfer of funds. The payment system can process the login request (received at 402) prior to the transfer of funds. The payment system can also perform the transfer of funds from the existing user account to another account (as requested at 410A or 410B). At 424, the payment system performs fraud preventative actions.

The payment system can also receive a subsequent login request to the existing user account, i.e., similar to that received at 402. Thus, the subsequent login request can be received during the fraud determination of the suspect login request. The payment system can then determine whether to provide access, to the initiator of the subsequent login request, to the duplicate user account or to the existing user account.

Figure 5:
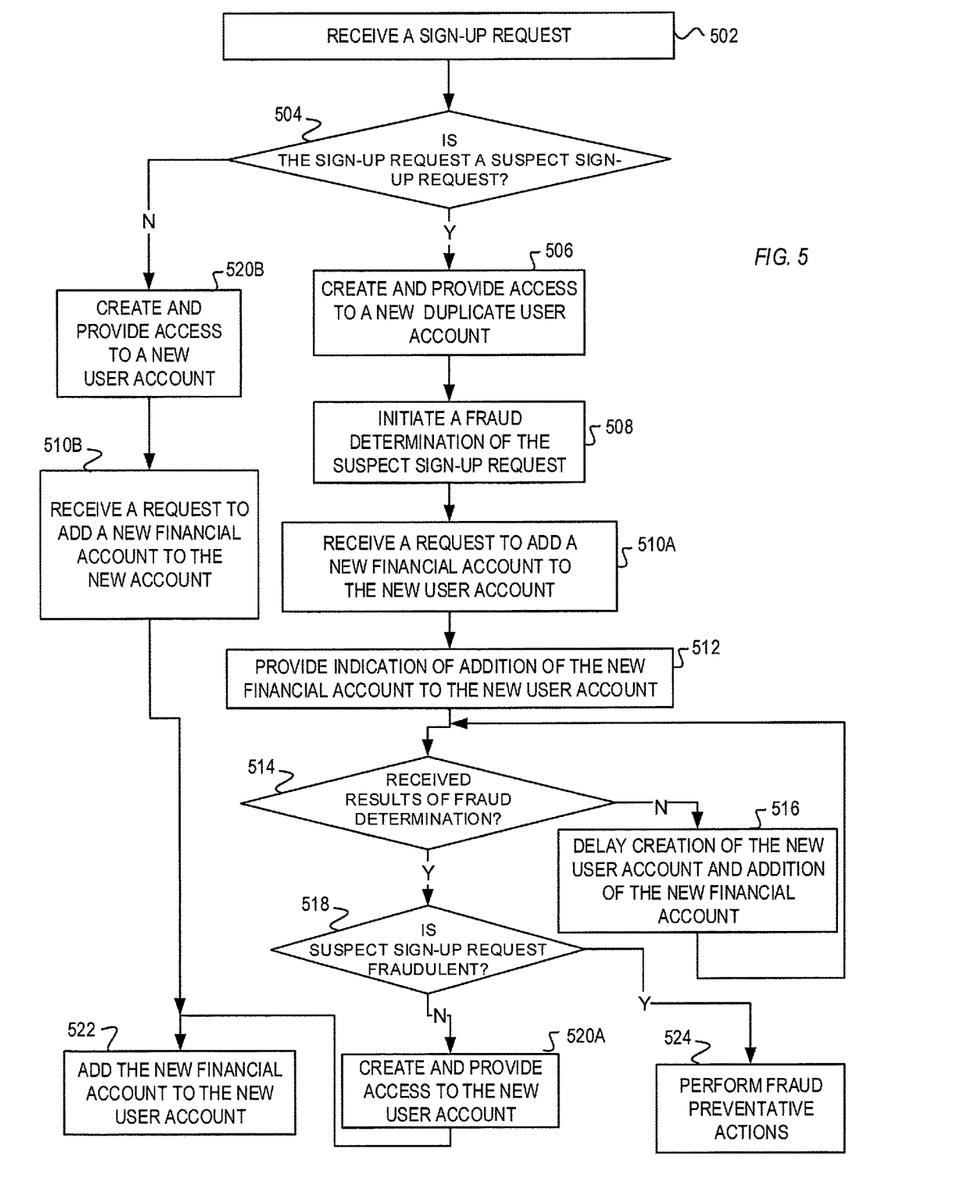
FIG. 5 is a flow diagram illustrating embodiments of operations for processing of fraudulent sign-up requests.

FIG. 5 is a flow diagram illustrating embodiments of operations for processing of fraudulent sign-up requests. The method of FIG. 5 is described with reference to the systems and components described in FIGS. 1-3 (for illustration purposes and not as a limitation). The example operations can be carried out by various modules of the payment system 106. The method of FIG. 5 is similar to that shown by FIG. 4, with variations to illustrate processing of sign-up requests.

Beginning with 502, the payment system receives a sign-up request for signing-up for a new user account at the payment system 106. For example, the authentication module 208 can receive the sign-up request 206 from the user device 104.

At 504, the payment system determines whether the sign-up request is a suspect sign-up request. The element 504 is similar to the element 404 of FIG. 4. Thus, the authentication module of the payment system can determine an authentication risk level of the sign-up request by communicating with a risk module or a fraud agent. The authentication module can randomly select the sign-up request as the suspect sign-up request. If the payment system determines that the sign-up request is a suspect sign-up request, the payment system performs element 506 next. Otherwise, the payment system performs element 520B next.

At 506, the payment system provides access to a new duplicate user account. The flypaper module can generate the new duplicate user account responsive to receiving the suspect sign-up request. As discussed above with reference to FIG. 3, the new duplicate user account 220(1) can include duplicate state information 316 and duplicate financial information 314 based on the suspect sign-up request.

In response to receiving the suspect sign-up request, the payment system can generate a duplicate user interface to be provided to an initiator of the suspect sign-up request. With reference to FIG. 2, the interface module 216 can provide the duplicate user interface to the user device 102 that initiated the suspect sign-up request. The duplicate user interface can be based on the suspect sign-up request, and can provide imitation controls for imitating access to financial information of a new user account. For example, the user device 102 can receive communication from the interface module 216 for displaying the duplicate user interface with the imitation controls. The interface module 216 can receive communication from the user device 104, via the duplicate user interface, that modify the contents of the new duplicate user account (e.g., the user account 220(2)), without affecting the new user account 218(2).

At 508, the payment system initiates fraud determination of the suspect sign-up request. The element 508 is similar to the element 408. The authentication module 208 can communicate with the risk module 210, the external risk module 114 and/or the fraud agent 112 to initiate the fraud determination. The payment system can also add the suspect sign-up request into the flypaper transaction queue.

At 510A, the payment system receives a request to add a new financial account to the new user account. The new financial account can be a bank account or a credit card account. The payment system can add this request to the flypaper transaction queue. It is noted that 510B is similar to 510A, as at 510B the payment system also receives a request to add a new financial account to the new user account. However, the flow to element 510B is from element 520B where the new user account is created and the request is not suspect (i.e., the request is good), whereas the flow to element 510A is from element 508 where the new user account is not created and the request is suspect. Furthermore, the requested transaction of 510B can be added to the transaction queue 222, and not to the flypaper transaction queue 226.

At 512, the payment system provides an indication of addition of the new financial to the new user account. Similarly as discussed above with reference to element 412, whereas the indication can indicate origin at the existing user account, the indication can be transmitted from the new duplicate user account.

At 514, the payment system determines whether results of the fraud determination have been received. The element 514 is similar to the element 414. If the results of the fraud determination have been received, flow continues to 518, otherwise, flow continues to 516. At 516, the payment system delays creation of the new user account. As the new user account is delayed, the payment system also delays addition of the new financial account to the new (and not yet created) user account. The payment system can also delay processing of any subsequent requests. With reference to the above examples, the payment system may not process the quarantined requested transaction 228(1) that was requested at 510A.

At 518, the payment system determines if the suspect sign-up request is fraudulent. With relation to the above examples, the flypaper module 214 can determine if the results of the fraud determination (e.g., from the risk module 210, the external risk module 114, and/or the fraud agent) indicate that the suspect sign-up request 206 is fraudulent. If the results of the fraud determination indicate that the suspect sign-up request is fraudulent, flow continues to 524, otherwise, flow continues to 520A.

At both elements 520A and 520B, the payment system provides access to a new user account. At both elements 520A and 520B, the payment system can create the new user account in response to the sign-up request 206. It is noted that elements 520A and 520B are similar. However, the flow to element 520B is from element 504, whereas the flow to element 520A is from element 518.

At 522, the payment system adds the financial account to the new user account. The payment system can process the sign-up request (received at 502). At 524, the payment system performs fraud preventative actions. The element 524 is similar to the element 424.

The payment system can also receive a login request to the new user account, i.e., a login to the user account for which the sign-up request was received at 502. The login request can be received during the fraud determination of the suspect sign-up request. The payment system can then determine whether to provide access to the new duplicate user account or to provide access to another new duplicate user account.

Figure 6:
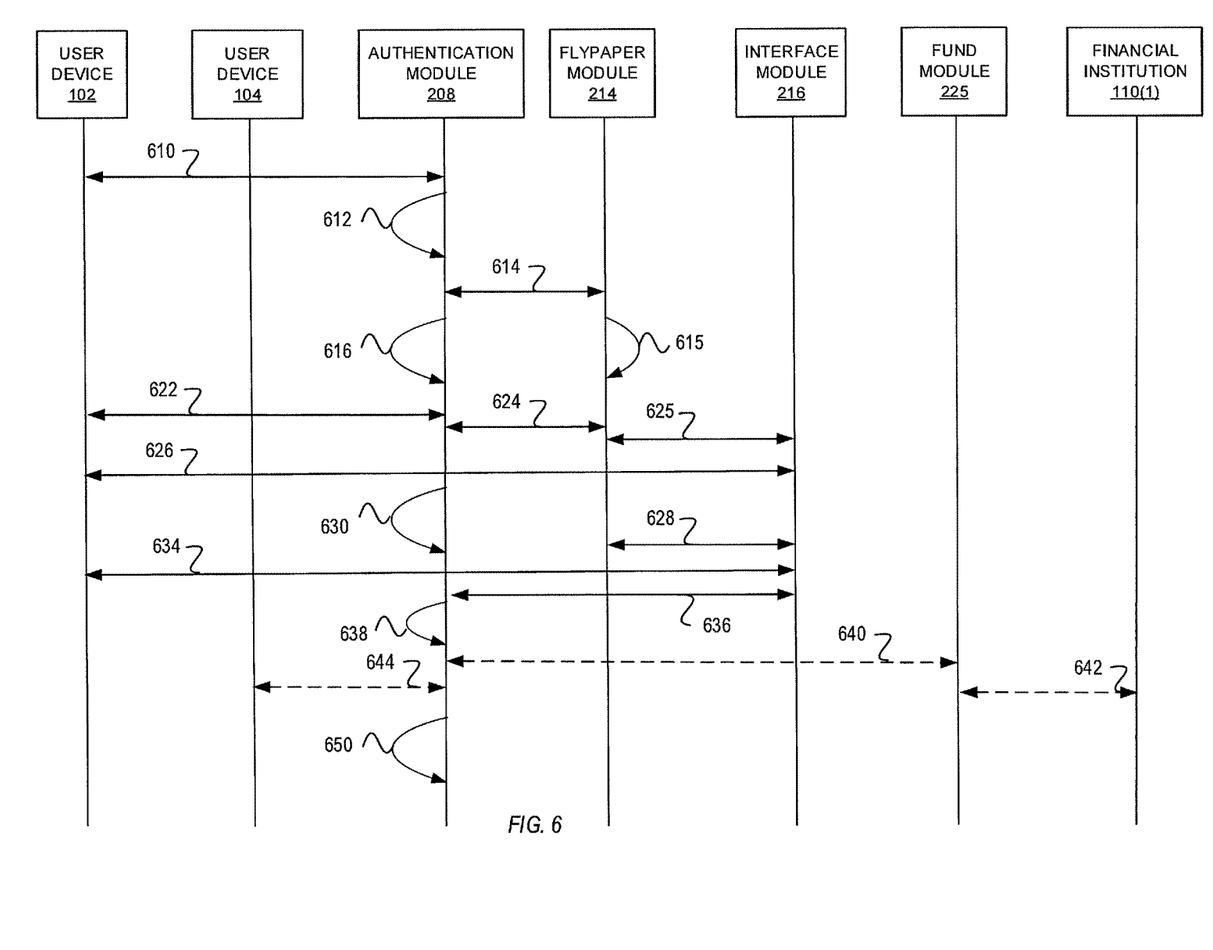
FIG. 6 is a timing diagram illustrating one embodiment of communication between various modules of a payment system communicating with user devices when processing fraudulent logins and/or fraudulent sign-ups.

FIG. 6 is a timing diagram illustrating embodiments of communication between various modules of a payment system communicating with user devices when processing fraudulent logins. As shown by FIG. 6, a user device 102 communicates with the authentication module 208. The payment system includes the authentication module 208, the flypaper module 214, the interface module 216, and the fund module 225. The communications of FIG. 6 can be performed over one or more communication networks, such as shown by FIGS. 1 and 2. Portions of the timing diagram of FIG. 6 correspond to the flow diagrams of FIGS. 4 and 5.

At 610, the user device 102 communicates with the authentication module 208. The communication can be a login request or a sign-up request (the "initial request"). At 612, the authentication module 208 can determine whether the received login request or sign-up request is suspect. At 614, the authentication module 208, in response to determining that the login request or sign-up request is suspect, can communicate with the flypaper module 214. At 615, the flypaper module 214 can provide access to a duplicate user account for a suspect login request, or provide access to a new duplicate user account for a suspect sign-up request. At 616, the authentication module 208 initiates a fraud determination for the suspect login request or the suspect sign-up request.

At 622, the authentication module 208 can receive a subsequent request from the user device 102. If the initial request is for a login, the subsequent request can be for transferring funds from the existing account to another account. If the initial request is for a sign-up, the subsequent request can be for adding a new financial account to the new user account. At 624, the authentication module 208 communicates the subsequent request to the flypaper module 214 to add to a flypaper transaction queue and/or delay performance of that subsequent request. At 625, the flypaper module 214 communicates with the interface module 216, such as to provide indications to the user device 102. At 626, the interface module 216 can provide indication that the initial and/or subsequent request is being performed.

At 628, the flypaper module 214 can communicate with the interface module 216 to continue to provide indications to display on the duplicate user interface, such as to imitate progress of any quarantined transaction(s), or to request additional information from the user device 102 that can be helpful for fraud determination. At 630, the authentication module 208 determines whether it has received results of the fraud determination. If the results are received, the authentication module 208 can also determine whether the initial request is fraudulent. At 634, the interface module 216 can provide additional indications to the user device 102, as well as receive additional information from the user device 102. At 636, the interface module 216 can provide the additional information to the authentication module 208, which can use this information to aid in the fraud determination process.

At 638, the authentication module 208 can determine, based on results of the fraud determination, whether to perform the initial request, i.e., whether to create and provide access to a new user account, and whether to perform the subsequent request. The authentication module 208 can also determine whether to perform fraud preventative actions. At 640, the authentication module 208 can communicate with the fund module 225 to transfer funds, depending on the determination at 638. At 642, the fund module 225 can communicate with the financial institution 110(1) to perform a transfer of funds. It is noted that if the transfer of funds is between two payment accounts at the payment system, the fund module 225 can move the requested balance between the two payment accounts without communicating with the financial institution 110(1). At 644, the authentication module 208 can receive a subsequent login request from the user device 104. At 650, the authentication module 208 can determine, responsive to receiving the subsequent login request, what type of account access to provide to the user device 104.

It should be understood that FIGS. 1-6 and the operations described herein are examples meant to aid in understanding embodiments and should not be used to limit embodiments or limit scope of the claims. Embodiments may perform additional operations, fewer operations, operations in a different order, operations in parallel, and some operations differently. For example, one or more elements, steps, or processes described with reference to the flow diagrams of FIGS. 4 and 5 may be omitted, described in a different sequence, or combined as desired or appropriate.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible and/or non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The computer program code may execute (e.g., as compiled into computer program instructions) entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flow diagram illustrations and/or block diagrams of methods, apparatus (systems) and computer program products according to embodiments of the inventive subject matter. It will be understood that each block of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer, or other programmable data processing apparatus to produce a machine, such that the computer program instructions, which execute via the processor of the computer or other programmable data processing apparatus, create means for implementing the functions/acts specified in the flow diagrams and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagrams and/or block diagram block or blocks.

Figure 7:
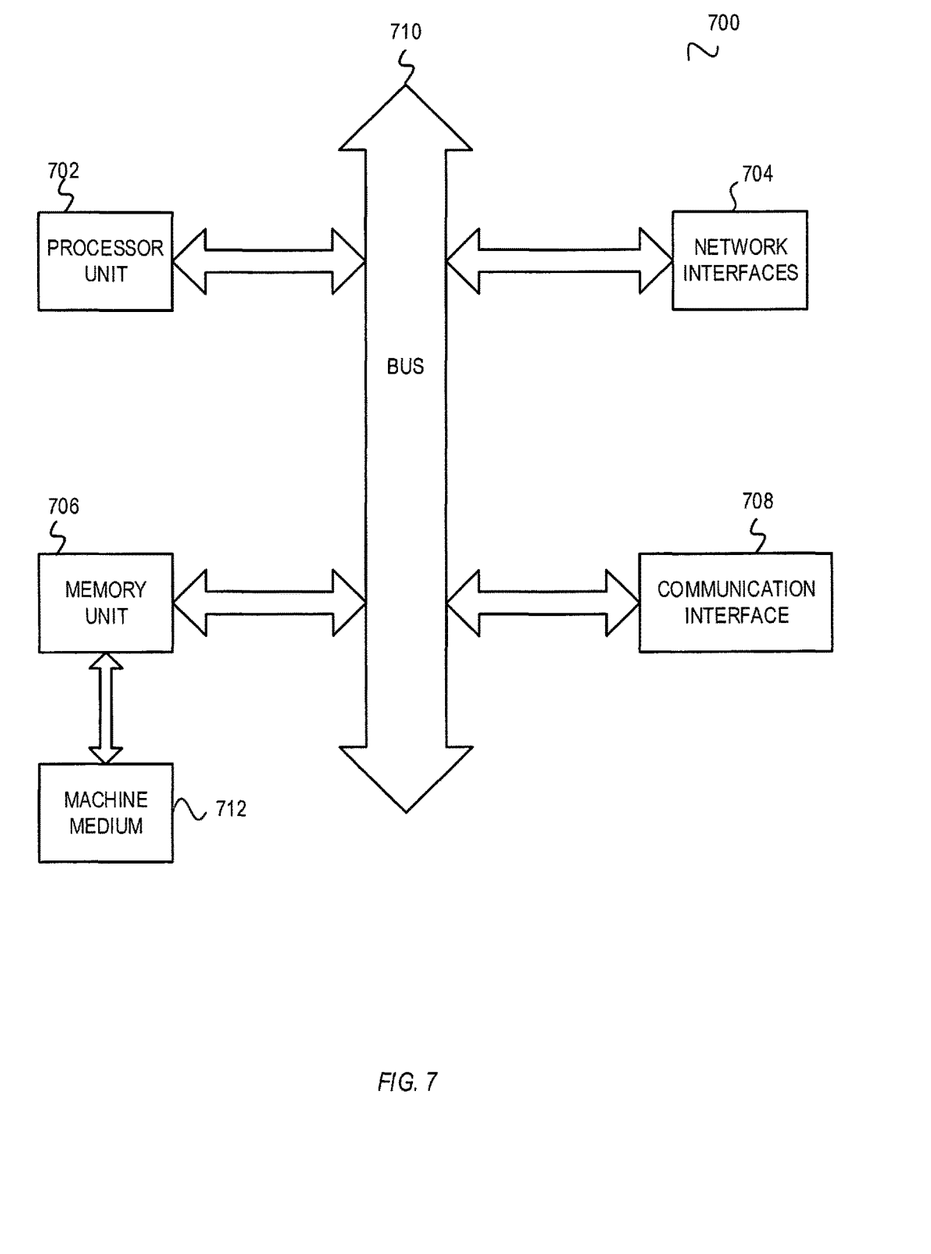
FIG. 7 is a block diagram of one embodiment of an electronic device used in the communication systems of FIGS. 1 and 2.

FIG. 7 is a block diagram of one embodiment of an electronic device used in the communication systems of FIGS. 1-3 and 6. In some implementations, the electronic device 700 may be one of a laptop computer, a tablet computer, a mobile phone, a powerline communication device, a smart appliance (PDA), a user device, a server, or another electronic system. The electronic device 700 can include processor unit 702 (possibly including multiple processors, multiple cores, multiple nodes, and/or implementing multi-threading, etc.). The electronic device 700 can also include memory unit 706. The memory unit 706 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 700 can also include bus 710 (e.g., PCI, ISA, PCI-Express, HyperTransport®, InfiniBand®, NuBus, AHB, AXI, etc.), and network interfaces 704 can include wire-based interfaces (e.g., an Ethernet interface, a powerline communication interface, etc.). The electronic device 700 includes a communication interface 708 for network communications. The communication interface 708 can include at least one of a wireless network interface (e.g., a WLAN interface, a Bluetooth interface, a WiMAX interface, a ZigBee interface, a Wireless USB interface, etc.), In some implementations, the electronic device 700 may support multiple network interfaces—each of which is configured to couple the electronic device 700 to a different communication network.

The memory unit 706 can embody functionality to implement embodiments described in FIGS. 1-6 above. In one embodiment, the memory unit 706 can include one or more of functionalities that facilitate managing fraudulent logins and/or sign-ups at payment systems. Any one of these functionalities may be partially (or entirely) implemented in hardware and/or on the processor unit 702. For example, some functionality may be implemented with an application specific integrated circuit, in logic implemented in the processor unit 702, in a co-processor on a peripheral device or card, etc. Further, realizations may include fewer or additional components not illustrated in FIG. 7 (e.g., video cards, audio cards, additional network interfaces, peripheral devices, etc.). The processor unit 702, the memory unit 706, the network interfaces 704, and the communication interface 708 are coupled to the bus 710. Although illustrated as being coupled to the bus 710, the memory unit 706 may be coupled to processor unit 702.

While the embodiments are described with reference to various implementations and exploitations, it will be understood that these embodiments are illustrative and that the scope of the inventive subject matter is not limited to them. In general, techniques for managing fraudulent logins and/or sign-ups at payment systems as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for detecting fraudulent sign-ups at a payment system, the method comprising:

receiving, by one or more hardware processors associated with the payment system from a user device via a network, a sign-up request for registering a first user account with the payment system for a user associated with the user device, wherein the first user account was not registered with the payment system prior to receiving the sign-up request;

determining, by the one or more hardware processors, that the sign-up request is a suspect sign-up request based on an indication that the sign-up request may be fraudulent;

in response to determining that the sign-up request is a suspect sign-up request, creating, by the one or more hardware processors, (i) a duplicate account corresponding to the first user account based on information provided in the sign-up request and (ii) a duplicate user interface for accessing the duplicate account;

generating a suspect transaction queue associated with the duplicate account and a transaction queue associated with the first user account;

providing, by the one or more hardware processors, the user device access to the duplicate account via the duplicate user interface without providing the user device access to the first user account;

initiating, by the one or more hardware processors, a fraud determination process to determine whether the sign-up request is fraudulent;

prior to obtaining a result from the fraud determination process, receiving, by the one or more hardware processors from the user device via the duplicate user interface, a funding source addition request for adding a financial account to the first user account;

prior to processing the funding source addition request for the first user account, (i) modifying, by the one or more hardware processors, the duplicate account by adding the financial account to the suspect transaction queue associated with the duplicate account and (ii) providing, by the one or more hardware processors via the duplicate user interface, the user access to the modified duplicate account including the financial account, wherein the duplicate user interface imitates access to the first user account and indicates, to the user, that the financial account has been added to the first user account without adding the financial account to the first user account and without providing the user device access to the first user account;

subsequent to the modifying the duplicate account, determining, by the one or more hardware processors, that the sign-up request is not fraudulent based on the fraud determination process; and in response to determining that the sign-up request is not fraudulent, (i) transferring, by the one or more hardware processors, the funding source addition request from the suspect transaction queue to the transaction queue associated with the first user account, and (ii) providing, by the one or more hardware processors, the user device access to the first user account via an account user interface, wherein the financial account is accessible by the payment system for transactions associated with the first user account after the funding source addition request is processed.

2. The method of claim 1, wherein the duplicate user interface comprises imitation controls for imitating access of financial information of the first user account.

3. The method of claim 1, further comprising:

creating the first user account with the payment system based on the information provided in the sign-up request.

4. The method of claim 1, further comprising:

receiving, from a second user device via the network, a login request for logging in to the first user account prior to determining that the sign-up request is not fraudulent;

determining that no results have been obtained from the fraud determination process associated with the sign-up request; and in response to determining that no results have been obtained from the fraud determination process, automatically providing the second user device access to the duplicate account via the duplicate user interface without providing the second user device access to the first user account.

5. The method of claim 1, further comprising:

monitoring interactions between the user and the duplicate user interface;

modifying the duplicate account based on the monitored interactions, wherein the modifying the duplicate account comprises changing a parameter associated with the duplicate account; and in response to determining that the sign-up request is not fraudulent, modifying the first user account by changing the parameter associated with the first user account.

6. The method of claim 1, further comprising:

determining a duplicate state based on interactions of the user with the duplicate account via the duplicate user interface; and incorporating the duplicate state into the first user account.

7. A system comprising:

a non-transitory memory; and one or more hardware processors coupled with the non-transitory memory and configured to read instructions from the non-transitory memory to cause the system to perform operations comprising:

receiving, from a user device via a network, a sign-up request for registering a first user account with a payment system for a user associated with the user device wherein the first user account was not registered with the payment system prior to receiving the sign-up request;

determining that the sign-up request is a suspect sign-up request based on an indication that the sign-up request may be fraudulent;

in response to determining that the sign-up request is a suspect sign-up request, creating (i) a duplicate account corresponding to the first user account based on information provided in the sign-up request and (ii) a duplicate user interface for accessing the duplicate account;

generating a suspect transaction queue associated with the duplicate account and a transaction queue associated with the first user account;

providing the user device access to a duplicate account via the duplicate user interface without providing the user device access to the first user account;

initiating a fraud determination process to determine whether the sign-up request is fraudulent;

prior to obtaining a result from the fraud determination process, receiving, from the user device via the duplicate user interface, a funding source addition request for adding a financial account to the first user account;

prior to processing the funding source addition request for the first user account, (i) modifying the duplicate account by adding the financial account to the suspect transaction queue associated with the duplicate account and (ii) providing, via the duplicate user interface, the user access to the modified duplicate account including the financial account, wherein the duplicate user interface imitates access to the first user account and indicates, to the user, that the financial account has been added to the first user account without adding the financial account to the first user account and without providing the user device access to the first user account;

subsequent to the modifying the duplicate account, determining that the sign-up request is not fraudulent based on a fraud determination process; and in response to determining that the sign-up request is not fraudulent, (i) transferring the funding source addition request from the suspect transaction queue to the transaction queue associated with the first user account and (ii) providing the user device access to the first user account via an account user interface, wherein the financial account is accessible by the payment system for transactions associated with the first user account after the funding source addition request is processed.

8. The system of claim 7, wherein the determining that the sign-up request is a suspect sign-up request comprises, determining an authentication risk level of the sign-up request; and in response to a determination that the authentication risk level is higher than a threshold, determining that the sign-up request is a suspect sign-up request.

9. The system of claim 7, wherein the duplicate user interface comprises imitation controls for imitating access of financial information of the first user account.

10. The system of claim 7, wherein the operations further comprise:

detecting user interactions with the duplicate user interface; and providing information related to the detected user interactions to the fraud determination process.

11. A non-transitory machine-readable medium having stored thereon machine-readable instructions executable to cause a machine to perform operations comprising:

receiving, from a user device via a network, a sign-up request for registering a first user account with a payment system for a user associated with the user device, wherein the first user account was not registered with the payment system prior to receiving the sign-up request;

determining that the sign-up request is a suspect sign-up request based on an indication that the sign-up request may be fraudulent;

in response to determining that the sign-up request is a suspect sign-up request, creating (i) a duplicate account corresponding to the first user account based on information provided in the sign-up request and (ii) a duplicate user interface for accessing the duplicate account;

generating a suspect transaction queue associated with the duplicate account and a transaction queue associated with the first user account;

providing the user device access to the duplicate account via the duplicate user interface without providing the user device access to the first user account;

initiating a fraud determination process to determine whether the sign-up request is fraudulent;

prior to obtaining a result from the fraud determination process, receiving, from the user device via the duplicate user interface, a request for performing a change to the first user account;

prior to processing the request, (i) modifying the duplicate account by adding the request to the suspect transaction queue associated with the duplicate account and (ii) providing, on the user device via the duplicate user interface, the user access to the modified duplicate account, wherein the duplicate user interface imitates access to the first user account and indicates, to the user, that the request has been processed for the first user account without performing the change to the first user account and without providing the user device access to the first user account;

subsequent to the modifying the duplicate account, determining that the sign-up request is not fraudulent based on the fraud determination process; and in response to determining that the sign-up request is not fraudulent, (i) transferring the request from the suspect transaction queue to the transaction queue associated with the first user account and (ii) providing the user device access to the first user account via an account user interface, wherein the change is applied to transactions associated with the first user account after the request is processed.

12. The non-transitory machine-readable medium of claim 11, wherein the determining that the sign-up request is a suspect sign-up request comprises:
   determining an authentication risk level of the sign-up request; and
   in response to determining that the authentication risk level is higher than a threshold, determining that the sign-up request is a suspect sign-up request.

13. The non-transitory machine-readable medium of claim 11, wherein the duplicate user interface comprises imitation controls for imitating access of financial information of the first user account.

14. The non-transitory machine-readable medium of claim 11, wherein the operations further comprise:
   monitoring interactions between the user and the duplicate user interface; and
   providing information related to the monitored interactions to the fraud determination process.

15. The non-transitory machine-readable medium of claim 11, wherein the operations further comprise:
   in response to determining that the sign-up request is not fraudulent, retrieving the request from the suspect transaction queue for processing.

16. The non-transitory machine-readable medium of claim 11, wherein the operations further comprise:
   determining a duplicate state based on interactions of the user with the duplicate account via the duplicate user interface; and
   incorporating the duplicate state into the first user account.

17. The system of claim 10, wherein the user interactions correspond to a request for performing the modification to the first user account, and wherein the operations further comprise:
   inserting the request into the suspect transaction queue while waiting for a response from the fraud determination process; and
   in response to determining that the sign-up request is not fraudulent, retrieving the request from the suspect transaction queue for processing.

18. The system of claim 7, wherein the operations further comprise:
   determining a duplicate state based on interactions of the user with the duplicate account via the duplicate user interface; and
   updating the first user account by incorporating the duplicate state into the first user account.

19. The system of claim 7, wherein the determining that the sign-up request is not fraudulent is based on the result obtained from the fraud determining process.

20. The system of claim 19, wherein the fraud determining process comprises prompting the user for additional information related to the user.

* * * * *